(12) United States Patent
Luo et al.

(10) Patent No.: US 12,319,618 B2
(45) Date of Patent: Jun. 3, 2025

(54) ANTI-CORROSIVE CONCRETE GROUTING MATERIAL FOR COASTAL STRUCTURE CONNECTION AND METHOD FOR PREPARING THE SAME

(71) Applicant: QINGDAO UNIVERSITY OF TECHNOLOGY, Shandong (CN)

(72) Inventors: Jianlin Luo, Qingdao (CN); Jigang Zhang, Qingdao (CN); Qiuyi Li, Qingdao (CN); Song Gao, Qingdao (CN); Peng Zhang, Qingdao (CN); Fei Teng, Qingdao (CN)

(73) Assignee: QINGDAO UNIVERSITY OF TECHNOLOGY, Qingdao (CN)

( * ) Notice: Subject to any disclaimer, the term of this patent is extended or adjusted under 35 U.S.C. 154(b) by 758 days.

(21) Appl. No.: 17/619,534

(22) PCT Filed: Jul. 30, 2020

(86) PCT No.: PCT/CN2020/105887
§ 371 (c)(1),
(2) Date: Dec. 15, 2021

(87) PCT Pub. No.: WO2022/007062
PCT Pub. Date: Jan. 13, 2022

(65) Prior Publication Data
US 2022/0371960 A1    Nov. 24, 2022

(30) Foreign Application Priority Data
Jul. 10, 2020 (CN) .......................... 202010663534.8

(51) Int. Cl.
*C04B 28/06* (2006.01)
*C04B 18/06* (2006.01)
(Continued)

(52) U.S. Cl.
CPC .......... *C04B 28/065* (2013.01); *C04B 18/067* (2013.01); *C04B 18/08* (2013.01);
(Continued)

(58) Field of Classification Search
CPC ..... C04B 28/065; C04B 18/067; C04B 18/08; C04B 24/2623; C04B 28/04; C04B 28/14;
(Continued)

(56) References Cited

U.S. PATENT DOCUMENTS

2019/0256418 A1    8/2019  Riley

FOREIGN PATENT DOCUMENTS

| CN | 103450489 A | * 12/2013 | ................ C08J 3/24 |
| CN | 104058676 A | 9/2014 | |

(Continued)

OTHER PUBLICATIONS

Machine Translation of CN 109666360-A (Year: 2019).*
(Continued)

*Primary Examiner* — David P Turocy
*Assistant Examiner* — Anastasia A. Kuvayskaya
(74) *Attorney, Agent, or Firm* — Oliff PLC

(57) ABSTRACT

An anti-corrosive concrete grouting material for coastal structure connection and a method for preparing the same, belonging to the technical field of anti-corrosion of coastal assembled structure connectors. The grouting material includes the following components: expansible compound cement, slag sand, fly ash (FA), polyvinyl alcohol (PVA) (containing an oxidant and a catalyst), graphene oxide (GO), a water reducer, an adjusting admixture, a defoaming agent, a mineral admixture and water. A shrinkage-free effect of the grouting material is realized through internal curing of GO-PVA hydrogel, micro-expansion of the compound cement and shrinkage reduction effect of the FA; an energy storage effect of a GO-PVA hydrogel micro-capacitor is
(Continued)

exerted to avoid formation of a reinforcement corrosion micro-battery in a grouting material sleeve, a reinforcement corrosion self-immune effect is achieved, seawater corrosion resistance of the grouting material is improved by the slag sand, and it has huge economic and environmental protection benefits.

10 Claims, 1 Drawing Sheet

(51) Int. Cl.

| | | |
|---|---|---|
| *C04B 18/08* | (2006.01) | |
| *C04B 24/26* | (2006.01) | |
| *C04B 28/04* | (2006.01) | |
| *C04B 28/14* | (2006.01) | |
| C04B 103/30 | (2006.01) | |
| C04B 103/50 | (2006.01) | |
| C04B 111/24 | (2006.01) | |
| C04B 111/70 | (2006.01) | |
| C04B 111/76 | (2006.01) | |

(52) U.S. Cl.
CPC .......... *C04B 24/2623* (2013.01); *C04B 28/04* (2013.01); *C04B 28/14* (2013.01); *C04B 2103/302* (2013.01); *C04B 2103/50* (2013.01); *C04B 2111/24* (2013.01); *C04B 2111/70* (2013.01); *C04B 2111/76* (2013.01)

(58) Field of Classification Search
CPC .......... C04B 2103/302; C04B 2103/50; C04B 2111/70; C04B 2111/24; C04B 2111/76; C04B 40/0042; C04B 2111/26; C04B 28/06; C04B 2111/00008; C04B 2201/50; Y02W 30/91
See application file for complete search history.

(56) References Cited

FOREIGN PATENT DOCUMENTS

| | | | | |
|---|---|---|---|---|
| CN | 105885064 A | | 8/2016 | |
| CN | 106396548 A | | 2/2017 | |
| CN | 106587691 A | * | 4/2017 | ......... C04B 20/1055 |
| CN | 106673548 A | | 5/2017 | |
| CN | 109231917 A | | 1/2019 | |
| CN | 109666360 A | * | 4/2019 | ................ C08F 2/26 |
| CN | 110015871 A | | 7/2019 | |
| CN | 110683809 A | * | 1/2020 | ........... C04B 20/023 |
| EP | 3640223 A1 | * | 4/2020 | ............. B82Y 30/00 |
| KR | 101222086 B1 | * | 1/2013 | ............. C04B 24/00 |
| KR | 20170142452 A | * | 12/2017 | ......... C04B 24/2641 |

OTHER PUBLICATIONS

Machine Translation of CN 110683809-A (Year: 2020).*
Li et al. Multi-scale improved damping of high-volume fly ash cementitious composite: combined effects of polyvinyl alcohol fibers and graphene oxide, Construction and Building Materials, 260, 2020, 119901 (Year: 2020).*
Senani et al. Substitution of the natural sand by crystallized slag of blast furnace in the composition of concrete, Alexandria Engineering Journal, 57, 2017, pp. 851-857 (Year: 2017).*
Yao et al. Graphene oxide-coated poly(vinyl alcohol) fibers for enhanced fiber-reinforced cementitious composites. Composites Part B, 174, 2019, 107010 (Year: 2019).*
KR_101222086_Machine_Translation (Year: 2013).*
KR_20170142452_Machine_Translation (Year: 2017).*
CN_103450489_Machine_Translation (Year: 2013).*
Li H et al. Influence of defoaming agents on mechanical performances and pore characteristics of Portland cement paste/mortar in presence of EVA dispersible powder. Journal of Building Engineering, 41, 2021, 102780 (Year: 2021).*
CN_106587691_Machine_Tanslation (Year: 2017).*
Jena et al. (A review on recent advances in graphene oxide-based composite coatings for anticorrosion applications, Progress in Organic Coatings, 173, 2022, 107208 (Year: 2022).*
KR_101222086_Original (Year: 2013).*
KR_20170142452_Original (Year: 2017).*
CN_106587691_Original (Year: 2013).*
EP_3640223_A1_Original (Year: 2020).*
Pei, Chun et al., "Synergistic Effects of a Novel Method of Preparing Graphene/Polyvinyl Alcohol to Modify Cementitious Material", Construction and Building Materials, vol. 258, (2020), 119647, 10 pages.
Dec. 21, 2020 Search Report issued in International Patent Application No. PCT/CN2020/105887.
Dec. 21, 2020 Written Opinion issued in International Patent Application No. PCT/CN2020/105887.

* cited by examiner

ANTI-CORROSIVE CONCRETE GROUTING MATERIAL FOR COASTAL STRUCTURE CONNECTION AND METHOD FOR PREPARING THE SAME

TECHNICAL FIELD

The present invention belongs to the field of anti-corrosion of coastal structure connectors, and in particular, relates to an anti-corrosive concrete grouting material for coastal structure connection and a method for preparing the same.

BACKGROUND

Information of the Related Art part is merely disclosed to increase the understanding of the overall background of the present invention, but is not necessarily regarded as acknowledging or suggesting, in any form, that the information constitutes the prior art known to a person of ordinary skill in the art.

Reinforced concrete structures are widely used in the field of coastal structure engineering such as offshore buildings, bridges and tunnels, wind and nuclear power plants, oil drilling platforms, seaports and wharfs. These coastal structures often fail prematurely due to marine corrosive environments with high chloride ion and sulfate concentration, for example. Located at an offshore environment, a highway bridge built in 1967 suddenly collapsed in 2018 after 40 years of service due to reinforcement corrosion caused by marine sulfide and chloride, and poor maintenance, resulting in a large number of casualties. Certain data shows that a substructure of a sea-crossing bridge completed in December 2002 had the problems of serious concrete peeling and internal reinforcement exposure in the spray splash zone in 2007. In fact, as a porous heterogeneous material, seawater and oxygen will reach the reinforcement surface along gaps in concrete and produce corrosion free electrons. These electrons are transmitted to a cathode zone through the reinforcement, and negative ions in the solution are transmitted to an anode zone through a pore solution, which easily cause the formation of a large number of corrosive micro-batteries.

With the development of modern industrial technology and assembly manufacturing industry, assembled buildings, which are less restricted by climatic conditions, capable of saving labor and improving construction quality and are low in overall production cost, have been elevated to the national level, and the construction industrialization is imperative. A grouting sleeve is a key component of assembled buildings, which requires the corresponding grouting material to not only have good grouting rheology, but also meet the requirements of rapid setting, early strength, volume stability and good durability, so as to quickly connect all kinds of prefabricated components such as beams, plates, columns and supports to form an overall assembled structure. At present, cement-based grouting materials sold in the market and used in engineering often have some problems, such as slow or too fast setting time, large loss of fluidity over time, low early strength and shrinkage after hardening. Therefore, it is urgent to develop an early-strength shrinkage-free cement-based grouting material.

At the same time, in the development of the coastal assembly engineering, the inventor found the following problems:

(1) The grouting sleeve for the connection of the corresponding structure easily forms a corrosive micro-battery. Once the basic connection function is lost due to the corrosion of the grouting sleeve, not only large direct economic losses will be caused, but also it is more difficult and complex to repair.

(2) Due to the narrow inner cavity of the reinforcement sleeve, conventional anti-seepage, anti-rust and anti-corrosion means such as increase of thickness of a concrete protective layer, doping of a reinforcement rust inhibitor (as described in patent No. CN110015871A, which describes a method of doping an early strength agent and a rust inhibitor at the same time), concrete surface coating, electrochemical desalination and cathodic protection are either impracticable, or the use effect is poor, or there is no platform to implement.

(3) When the early-strength shrinkage-free cement-based grouting material sleeve is used to quickly connect the coastal structure, it is difficult to ensure sufficient anti-corrosion durability while having good fluidity, early strength and high strength, as well as expansion without shrinkage.

SUMMARY

In order to overcome the problems, the present invention provides an anti-corrosive concrete grouting material for coastal structure connection and a method for preparing the same. The anti-corrosive concrete grouting material provided by the present invention is poured into a reinforcement sleeve through a gravity grouting method or a pressure grouting method, then embedded into a connecting position of coastal prefabricated components, cured and formed, thus obtaining an anti-corrosive concrete grouting material sleeve which is applied to the coastal structure to realize rapid connection.

In order to realize the above technical objectives, the present invention adopts the technical solutions as follows:

In a first aspect of the present invention, the present invention provides an anti-corrosive concrete grouting material for coastal structure connection, which consists of the following raw materials in parts by weight: 1 part of expansible compound cement, 1-2 parts of slag sand, 0.05-0.2 part of fly ash, 0.005-0.05 part of polyvinyl alcohol, 0.0002-0.002 part of graphene oxide, 0.005-0.01 part of a water reducer, 0.005-0.01 part of an adjusting admixture, 0.0001-0.001 part of a defoaming agent, 0-0.05 part of a mineral admixture and 0.25-0.55 part of water.

The present invention provides an anti-corrosive early-strength shrinkage-free cement-based grouting material for coastal structure connection. By adopting the anti-corrosive nano concrete grouting material and a preparation process provided by the present invention, not only can a complete set of grouting sleeve system of coastal assembled structures be quickly connected, but also the anti-corrosion durability can be effectively ensured.

In a second aspect of the present invention, the present invention provides a method for preparing an anti-corrosive concrete grouting material for coastal structure connection, which includes:

preparing a GO-PVA prepolymer solution by adopting an in-situ polymerization and intercalation method using polyvinyl alcohol and graphene oxide as raw materials in the presence of an oxidant;

uniformly mixing fly ash, a water reducer, a catalyst and the GO-PVA prepolymer solution to form GO-PVAH@FA;

dispersing GO-PVAH@FA in a solution containing a water reducer and a retarder to form GO-PVAH@FA suspension;

uniformly mixing expansible compound cement, blast furnace heavy slag sand and ground slag powder to form a dry mixture of grouting material;

mixing the GO-PVAH@FA suspension with the dry mixture of grouting material and a defoaming agent to obtain the anti-corrosive concrete grouting material for coastal structure connection.

In the present invention, the GO nano active template effect will effectively reduce the porosity of a hardened body of the grouting material, improve the compactness of the grouting material, reduce ion permeation paths, and delay the time that a seawater corrosion medium reaches a reinforcement surface of the sleeve. At the same time, GO containing many functional groups such as hydroxyl, epoxy and carboxyl groups is stably combined with PVA electrolyte containing many hydroxyl groups to form a large number of GO-PVAH micro-capacitors. These GO-PVAH micro-capacitors uniformly dispersed in the grouting material through an FA medium can store a large amount of grouting material pore solution electrolyte and capture ions migrated from the seawater medium, so as to avoid the formation of corrosive batteries in the grouting material reinforcement sleeve, effectively prevent the electrochemical corrosion of reinforcement, and then significantly improve the chloride ion permeation resistance and seawater corrosion resistance of the grouting material.

In a third aspect of the present invention, the present invention provides application of any of the anti-corrosive concrete grouting materials for coastal structure connection in construction of coastal structure engineering. The coastal structure engineering includes offshore buildings, bridges and tunnels, wind and nuclear power plants, oil drilling platforms, seaports and wharfs.

The anti-corrosive nano concrete grouting material provided by the present invention can realize fast connection and has excellent anti-corrosion durability. Therefore, it is expected to be widely used in the construction of coastal structure engineering, especially in the grouting sleeve assembly construction of offshore buildings, bridges and tunnels, wind and nuclear power plants, oil drilling platforms, seaports and wharfs.

The present invention has the following beneficial effects:

(1) By adopting the anti-corrosive nano concrete grouting material and the preparation process provided by the present invention, not only can a complete set of grouting sleeve system of coastal assembled structures be quickly connected, but also the anti-corrosion durability can be effectively ensured. As can be seen from FIGS. 1 and 2, firstly, the dispersed and stable GO-PVAH is innovatively coated on the FA medium surface to realize its long-term and uniform distribution in the subsequent grouting material system, which can effectively offset the problem of greatly reducing the fluidity of the grouting material when GO is directly mixed with the grouting material; at the same time, the GO combined PVA prepolymer containing hydrophilic groups is evenly dispersed in the grouting material, which will effectively improve the anti-segregation and rheology over time of the grouting material; secondly, the hydration products of the expansible compound cement have a relatively thick hydration film and the ball lubrication characteristics of FA, which are helpful to realize the grouting rheology and self-compacting function of the corresponding grouting material; thirdly, the electric double layer adsorption effect of admixtures such as the water reducer and adjusting admixture on the grouting material will effectively ensure the realization of the grouting rheology of the grouting material. The realization mechanism of mechanical permeation resistance of the hardened body of the grouting material is as follow: on the one hand, the GO surface contains many hydrophilic groups such as hydroxyl, epoxy and carboxyl groups, which are conducive to the compatibility between GO and a cement mortar system; at the same time, GO can give full play to the nano crystal core and template effect, improve the micro-morphology of the hardened body of the corresponding grouting material, and then improve its mechanical strength, crack resistance and permeation resistance; on the other hand, GO-PVAH hydrogel can act as an internal curing component in the formation process of the grouting material, subsequent slow release of water effectively offsets the thermal shrinkage stress produced by the rapid hydration of the expansible compound cement and realizes the shrinkage reduction effect; moreover, the rapid setting and micro-expansion characteristics of the expansible compound cement and the self-lubricating shrinkage reduction effect of FA will effectively realize the early-strength shrinkage-free effect of the grouting material.

(2) For the anti-corrosive nano concentrate grouting material provided by the present invention, firstly, the GO nano active template effect will effectively reduce the porosity of the hardened body of the grouting material, improve the compactness of the grouting material, reduce the ion permeation paths, and delay the time that the seawater corrosion medium reaches the reinforcement surface of the sleeve; secondly, GO containing many functional groups such as hydroxyl, epoxy and carboxyl groups is stably combined with PVA electrolyte containing many hydroxyl groups to form a large number of GO-PVAH micro-capacitors, these GO-PVAH micro-capacitors uniformly dispersed in the grouting material through the FA medium can store a large amount of grouting material pore solution electrolyte and capture ions migrated from the seawater medium, so as to avoid the formation of corrosive batteries in the grouting material reinforcement sleeve, effectively prevent the electrochemical corrosion of reinforcement, and then significantly improve the chloride ion permeation resistance and seawater corrosion resistance of the grouting material.

In the anti-corrosive nano concrete grouting material provided by the present invention, GO-PVAH is synthesized on the FA surface and effectively delays the time that GO-PVAH@FA is added to the nano grouting material through the aqueous solution medium of the admixture, and low-alkalinity compound cement and admixtures such as FA capable of reducing alkalinity are jointly used, thus innovatively avoiding the bottleneck problem of deoxidation of GO in the strong-alkalinity environment. The grouting rheology and self-compacting function of the nano grouting material are realized through the coating of GO-PVAH on the FA medium surface, the relatively thick hydration film of compound cement slurry and the ball lubrication effect of FA; the continuous early strength, high strength, crack resistance and permeation resistance of the nano grouting material are realized through the GO nano template and compound cement effects; the shrinkage-free effect of the grouting material is realized through internal curing of GO-PVAH, micro-expansion of the compound cement and a shrinkage reduction effect of FA; an energy storage effect of the GO-PVAH micro-capacitors is exerted to avoid the formation of reinforcement corrosion micro-batteries in the grouting material sleeve, realize the reinforcement corrosion self-immune effect, and innovatively and synchronously realize the grouting rheology of the grouting material, and the early strength, no shrinkage, crack and permeability resistance and corrosion self-immune effect of the hardened body; the seawater erosion resistance of the grouting material is effectively improved by using the slag sand, and the resource utilization of slag sand solid waste is widened at the same time.

BRIEF DESCRIPTION OF THE DRAWINGS

The accompanying drawings constituting a part of the present invention are used to provide a further understanding of the present invention. The exemplary examples of the present invention and descriptions thereof are used to explain the present invention, and do not constitute an improper limitation of the present invention.

DETAILED DESCRIPTION

Figure 1:
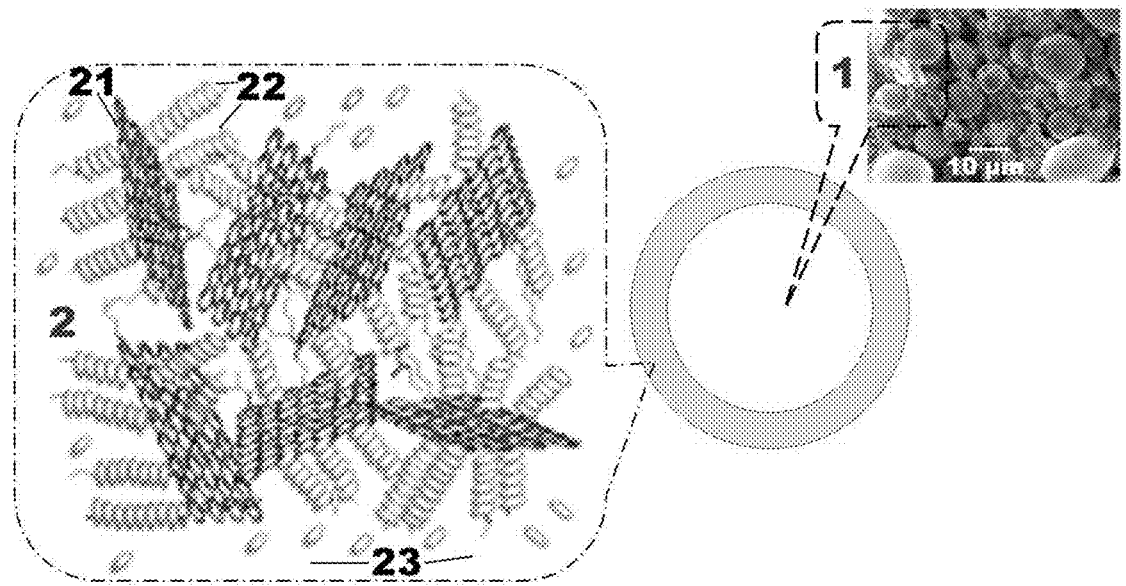
FIG. 1 is a schematic diagram of GO-PVA polymerization and intercalation and GO-PVAH@FA coating processes according to Embodiment 1 of the present invention. In the figure, 1-FA particle, 2-GO-PVA hydrogel layer, 21-GO sheet layer, 22-PVA polymer, 23-hydrogel; the GO-PVA hydrogel layer is coated on a surface of FA particles, and the PVA polymers are effectively intercalated into the GO sheet layer structures, forming positive and negative electric double layers of micro-capacitors, and effectively improving the marine corrosion resistance of a grouting material. The GO-PVA intercalation structure is to schematically reflect the intercalation structure formed by GO sheet layers and PVA linear chain polymers, and the SEM micro-morphology of FA is to schematically reflect the spherical hollow structure and size specification of FA, so as to help those skilled in the art to better understand.

It should be pointed out that the following detailed descriptions are all illustrative and are intended to provide further descriptions of the present invention. Unless otherwise specified, all technical and scientific terms used herein have the same meanings as those usually understood by a person of ordinary skill in the art to which the present invention belongs.

It should be noted that the terms used herein are merely used for describing specific implementations, and are not intended to limit exemplary implementations of the present invention. As used herein, the singular form is intended to include the plural form, unless the context clearly indicates otherwise. In addition, it should further be understood that terms "comprise" and/or "include" used in this specification indicate that there are features, steps, operations, devices, components, and/or combinations thereof.

In view of the above shortcomings of the prior art, the present invention provides an anti-corrosive nano concrete grouting material, a method for preparing the same and application thereof in rapid connection of coastal assembled structures. GO-PVAH is synthesized on an FA surface and effectively delays the time that GO-PVAH@FA is added to the nano grouting material through an aqueous solution medium of an admixture, and low-alkalinity compound cement and admixtures such as FA capable of reducing alkalinity are jointly used, thus innovatively avoiding the bottleneck problem of deoxidation of GO in a strong-alkalinity environment. The grouting rheology and self-compacting function of the nano grouting material are realized through coating of GO-PVAH on an FA medium surface, a relatively thick hydration film of compound cement slurry and a ball lubrication effect of FA; continuous early strength, high strength, crack resistance and permeation resistance of the nano grouting material are realized through GO nano template and compound cement effects; a shrinkage-free effect of the grouting material is realized through internal curing of GO-PVAH, micro-expansion of the compound cement and a shrinkage reduction effect of FA; an energy storage effect of GO-PVAH micro-capacitors is exerted to avoid formation of reinforcement corrosion micro-batteries in the grouting material sleeve, realize a reinforcement corrosion self-immune effect, and innovatively and synchronously realize the grouting rheology of the grouting material, and the early strength, no shrinkage, crack and permeability resistance and corrosion self-immune effect of the hardened body; the seawater erosion resistance of the grouting material is effectively improved by using the slag sand, the resource utilization of slag sand solid waste is widened at the same time, and finally, it has huge economic and environmental protection benefits in the field of rapid connection of coastal assembled structures.

The method specifically includes the following steps:

S1: dissolving PVA in hot water to prepare a PVA aqueous solution; mixing GO powder or aqueous dispersion into the PVA aqueous solution in the presence of a PVA oxidant, and intercalating PVA prepolymers into GO sheet layer structures by adopting an in-situ polymerization and intercalation process to obtain a GO-PVA prepolymer solution;

S2: adding FA, part of a water reducer and a PVA catalyst to the GO-PVA prepolymer solution, then coating GO-PVA hydrogel (GO-PVAH) on a surface of FA particles by adopting a thermal ultrasonic process to obtain GO-PVAH@FA, and sealing the GO-PVAH@FA for subsequent use;

S3: adding the GO-PVAH@FA to an admixture aqueous solution formed by the remaining water reducer and an adjusting admixture, and performing uniform mixing at high speed to obtain GO-PVAH@FA suspension; at the same time, mechanically mixing expansible compound cement, slag sand and a mineral admixture to form a dry mixture of grouting material;

S4: adding the GO-PVAH@FA suspension to the dry mixture of grouting material through grouting material mixing equipment and performing uniform mechanical mixing to obtain the anti-corrosive nano concrete grouting material.

In step S1, the PVA intercalation efficiency and GO dispersion effect in the GO-PVA prepolymer solution may be analyzed by adopting an automatic titration method, a rotary viscometer, a UV-Vis spectrophotometry and a micro-morphology method.

In step S2, the equilibrium swelling rate, light transmittance, structural cross-linking degree, micro distribution morphology and density of GO-PVAH may be determined by adopting a freeze-drying method, a UV-Vis spectrophotometry, a TG-DSC comprehensive thermal analysis method and a micro-morphology method respectively; the overall density, water content and organic content, interfacial peeling resistance and coating thickness of GO-PVAH@FA may be determined by adopting an ethanol drainage method, a TG-DSC comprehensive thermal analysis method, a peel strength method and a film thickness gauge respectively.

In step S4, the anti-corrosive nano concrete grouting material may be prepared by adopting the conventional method for preparing a grouting material known to those skilled in the art, and the types and amounts of corresponding water reducer, adjusting admixture and defoaming agent may be optimized through rheological properties (viscosity coefficient and shear stress) of the grouting material and the setting time (consistency and rheology over time) of the slurry. The performance characterization of the anti-corrosive nano concrete grouting material may be carried out in combination with the grouting ability, mechanical strength, expansion rate, water/oil permeability resistance and chloride ion permeation resistance methods well known to those skilled in the art. Electrochemical parameters such as reinforcement corrosion potential, polarization resistance, corrosion current density and electrochemical impedance spectroscopy, and mechanical parameters such as mechanical behavior (tensile strength and load-displacement curve), deformation performance (residual deformation and maximum elongation) and interfacial bonding force (bonding strength and failure characteristics) of the anti-corrosive nano concrete grouting material sleeve may be determined in combination with the electrochemical parameter and tensile and compressive mechanical fatigue performance characterization methods of the grouting sleeve well known to those skilled in the art.

A rubber plug familiar to those skilled in the art may be used to block a slurry filling port and a slurry discharge port of the reinforcement sleeve, and the construction quality of the grouting material may be evaluated by adopting methods such as ultrasonic or radar wave nondestructive detection familiar to those skilled in the art.

An anti-corrosive nano concrete grouting material includes the following components: expansible compound cement, slag sand, fly ash (FA), polyvinyl alcohol (PVA) (containing a corresponding oxidant and a corresponding catalyst), graphene oxide (GO), a water reducer, an adjusting admixture, a defoaming agent, a mineral admixture and water. A mass ratio of the components is 1:(1-2):(0.05-0.2):(0.005-0.05):(0.0002-0.002):(0.005-0.01):(0.005-0.01):(0.0001-0.001):(0-0.05):(0.25-0.55).

In some embodiments, the expansible compound cement includes the following components: sulphoaluminate cement (SAC), Portland cement and gypsum. A mass ratio of the components is 1:(0.65-1.25):(0-0.15). Hydration products of the expansible compound cement have a relatively thick hydration film and ball lubrication characteristics of FA, which are helpful to realize grouting rheology and self-compacting function of the corresponding grouting material.

The specific type of the slag sand in the present application is not specially limited. In some embodiments, the slag sand is one or a combination of more of blast furnace heavy slag sand, steel slag sand, titanium steel slag sand, copper nickel slag sand and nickel iron slag sand. A good particle grading curve is achieved through the following component matching: coarse sand with fineness modulus of 3.7-3.1 and average particle size of 0.5 mm or above; medium sand with fineness modulus of 3.0-2.3 and average particle size of 0.5 mm-0.35 mm; fine sand with fineness modulus of 2.2-1.6 and average particle size of 0.35 mm-0.25 mm; and ultrafine sand with fineness modulus of 1.5-0.7 and average particle size of 0.25 mm or below. A mass ratio of the components is 1:(1.1-2.0):(1-1.5):(1-1.5), and a ratio of the medium sand is guaranteed to be in a range of 27%-33%.

The seawater erosion resistance of the grouting material is effectively improved by using the slag sand, and the resource utilization of slag sand solid waste is widened at the same time.

In some embodiments, the FA is Class-I FA with a loss on ignition of less than or equal to 5% specified in GB/T 1596-2017 standard to obtain a better ball lubrication effect.

In some embodiments, the PVA is a PVA aqueous solution with an average polymerization degree of 500-600 and an alcoholysis degree of 88%. GO is dispersed in the PVA aqueous solution to form a stable GO-PVA prepolymer solution.

In some embodiments, the PVA oxidant and the PVA catalyst are respectively one of sodium periodate, potassium permanganate or potassium chlorate, and one of concentrated hydrochloric acid, dilute sulfuric acid, dilute nitric acid or boric acid mentioned in Chinese patent No. CN103450489 or CN105885064A, so as to intercalate PVA prepolymers in GO sheet layer structures through an in-situ polymerization and intercalation process.

In some embodiments, the GO is GO powder with monolayer rate of more than or equal to 90% and oxygen content of 35-45% or an aqueous dispersion with a concentration of 0.05-10 mg/ml. When the GO aqueous dispersion is used, the mass of the GO in the aqueous dispersion is calculated according to the concentration ratio, and water in the corresponding aqueous dispersion is calculated in the total amount of water used in the grouting material.

The specific type of the water reducer is not specially limited in the present application. In some embodiments, the water reducer is one or an optimized combination of more of polycarboxylic acid high-efficiency water reducer, naphthalene sodium sulfonate high-efficiency water reducer or melamine resin high-efficiency water reducer. The adjusting admixture is one of gluconate retarder, citric acid, tartaric acid and salt retarders thereof or lignosulfonate water-reducing retarder. The defoaming agent is one of silicone, polyether and polyether modified polysiloxane defoaming agents. The electric double layer adsorption effect of admixtures such as the water reducer and the adjusting admixture on the grouting material will effectively ensure the realization of the grouting rheology of the grouting material.

The specific source of the mineral admixture is not specially limited in the present application. In some embodiments, the mineral admixture is one or a combination of more of ground slag, fly ash, volcanic ash, silica fume or zeolite powder. The mineral admixture is mechanically mixed with the expansible compound cement and the slag sand to form a dry mixture of grouting material.

In some embodiments, the water is one of distilled water, deionized water or tap water. Those skilled in the art may select according to specific working conditions.

The present invention further provides application of the anti-corrosive nano concrete grouting material in connection of coastal structure engineering. Specifically, the anti-corrosive nano concrete grouting material is poured into a reinforcement sleeve through a gravity grouting method or a pressure grouting method, then embedded into a connecting position of coastal prefabricated components, cured and formed, thus obtaining an anti-corrosive concrete grouting material sleeve which is applied to the coastal structure to realize rapid connection.

In some embodiments, in the application of the anti-corrosive nano concrete grouting material, the coastal prefabricated components may be honeycomb beams, assembled laminated plates, prefabricated columns, prefabricated supports, etc.

In some embodiments, in the application of the anti-corrosive nano concrete grouting material, the reinforcement sleeve may be a semi-grouting sleeve with a slurry filling port and a slurry discharge port, a full-grouting sleeve, etc.

The present invention will be further described in detail below in combination with specific embodiments. It should be noted that the specific embodiments are intended to explain rather than limit the present invention.

Embodiment 1

A process for preparing an anti-corrosive nano concrete grouting material according to the present embodiment specifically included the following steps:

S1: 0.25 kg of PVA was dissolved in 5 L of 70° C. hot water to prepare a PVA aqueous solution with a concentration of 5%, an average polymerization degree of 500-600 and an alcoholysis degree of 88%; 0.025 kg of GO powder was mixed into the PVA aqueous solution in the presence of 0.02 kg of sodium periodate (PVA oxidant), and PVA prepolymers were intercalated into GO sheet layer structures by adopting an in-situ polymerization and intercalation process to obtain a GO-PVA prepolymer solution;

S2: 1.0 kg of FA, 0.1 kg of a polycarboxylic acid high-efficiency water reducer and 0.01 kg of concentrated hydrochloric acid (PVA catalyst) were added to the GO-PVA prepolymer solution, then GO-PVA hydrogel (GO-PVAH) was coated on a surface of FA particles by adopting an oil bath thermal ultrasonic dispersion process (oil temperature: 100° C., frequency: 10 kHz, power: 50 W, ultrasonic time: 30 min) to obtain GO-PVAH@FA, and the GO-PVAH@FA was sealed for subsequent use;

S3: the GO-PVAH@FA was added to an admixture aqueous solution formed by the remaining 0.15 kg of PCA-I polycarboxylic acid high-efficiency water reducer (purchased from Jiangsu Sobute New Material Co., Ltd.) and 0.3 kg of HN-B gluconate retarder (purchased from Qingdao Dingchang New Material Co., Ltd.), and uniform mixing was performed at high speed to obtain GO-PVAH@FA suspension; at the same time, 20 kg of expansible compound cement (consisting of 10 kg of 425 SAC, 9.5 kg of P.I 42.5 Portland cement and 0.5 kg of gypsum), 40 kg of blast furnace heavy slag sand (blast furnace heavy slag of Benxi Iron and Steel Co., Ltd., with an apparent density of 2560 kg/m³ and a chemical composition of $SiO_2$=32-38 %, CaO=40-42 %, MgO=8-11 %, $Al_2O_3$=5-8 %)(consisting of 8 kg of coarse sand, 12 kg of medium sand, 10 kg of fine sand and 10 kg of ultra-fine sand) and 0.5 kg of ground slag powder (obtained from blast furnace heavy slag of Benxi Iron and Steel Co., Ltd., with an apparent density of 2560 kg/m³, and obtained through ball milling) were mechanically mixed to form a dry mixture of corresponding grouting material;

S4: the GO-PVAH@FA suspension was added to the corresponding dry mixture of grouting material through a JJ-5 mortar mixer, uniform mechanical mixing was performed (rotating speed: 120 rpm, duration:4 min), and 0.005 kg of ACP1266 silicone defoaming agent (purchased from Dow Corning (Shanghai) Co., Ltd.) was added to eliminate possible bubbles to finally obtain the anti-corrosive nano concrete grouting material.

The anti-corrosive nano concrete grouting material was poured into a full-grouting reinforcement sleeve through a pressure grouting method (grouting pressure:5 MPa) to test electrochemical parameters and mechanical fatigue behavior of the reinforcement; it was tried to embed the reinforcement sleeve into a connection node of coastal prefabricated columns for quick formation to obtain an anti-corrosive nano concrete grouting material sleeve prefabricated column, and its rapid connection and anti-corrosion durability were evaluated.

Figure 2:
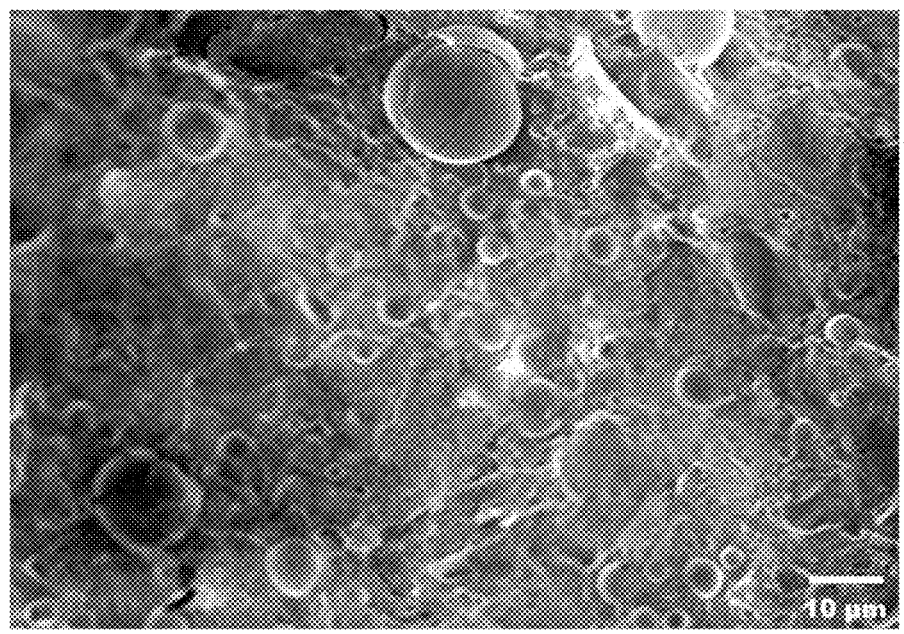
FIG. 2 is a scanning electron microscope photograph of a hardened body of an anti-corrosive nano concrete grouting material cured for 7 d according to Embodiment 1 of the present invention.

In step S1, the PVA intercalation efficiency and GO dispersion effect in the GO-PVA prepolymer solution were as shown in FIG. 1. In step S2, the swelling rate and coating thickness of GO-PVAH@FA were 30% and 65 μm, respectively. In step S4, the micro-morphology of a hardened body of the anti-corrosive nano concrete grouting material was as shown in FIG. 2, and the relevant performance was as shown in Table 1.

Embodiment 2

A process for preparing an anti-corrosive nano concrete grouting material according to the present embodiment specifically included the following steps:

S1: 0.5 kg of PVA was dissolved in 5 L of 80° C. hot water to prepare a PVA aqueous solution with a concentration of 10%, an average polymerization degree of 500-600 and an alcoholysis degree of 88%; 2 L of 10 mg/mL GO aqueous dispersion was mixed into the PVA aqueous solution in the presence of 0.015 kg of potassium permanganate (PVA oxidant), and PVA prepolymers were intercalated into GO sheet layer structures by adopting an in-situ polymerization and intercalation process to obtain a GO-PVA prepolymer solution;

S2: 1.5 kg of FA, 0.2 kg of an FDN-O naphthalene sodium sulfonate high-efficiency water reducer (purchased from Wuhan Zhuozhen Trading Co., Ltd.) and 0.01 kg of dilute sulfuric acid (PVA catalyst) were added to the GO-PVA prepolymer solution, then GO-PVA hydrogel (GO-PVAH) was coated on a surface of FA particles by adopting an oil bath thermal ultrasonic dispersion process (oil temperature: 120° C., frequency: 20 kHz, power: 50 W, ultrasonic time: 45 min) to obtain GO-PVAH@FA, and the GO-PVAH@FA was sealed for subsequent use;

S3: the GO-PVAH@FA was added to an admixture aqueous solution formed by the remaining 0.1 kg of naphthalene sodium sulfonate high-efficiency water reducer and 0.25 kg of citric acid, and uniform mixing was performed at high speed to obtain GO-PVAH@FA suspension; at the same time, 25 kg of expansible compound cement (consisting of 12 kg of 525 SAC, 12 kg of P.II 52.5 Portland cement and 1 kg of gypsum), 35 kg of steel slag sand (steel slag sand of Benxi Iron and Steel Co., Ltd., with an apparent density of 3160 kg/m³ and a chemical composition of CaO=35-38%, $Fe_2O_3$=20-24%, $SiO_2$=18-21%, $Al_2O_3$=5-8%, MgO=5-7%) (consisting of 8 kg of coarse sand, 12 kg of medium sand, 8 kg of fine sand and 7 kg of ultra-fine sand) and 1 kg of fly ash were mechanically mixed to form a dry mixture of corresponding grouting material;

S4: the GO-PVAH@FA suspension was added to the corresponding dry mixture of grouting material through an electric high-speed mixer, uniform mechanical mixing was performed (rotating speed: 500 rpm, duration: 3 min), and 0.008 kg of RK-1500 polyether defoaming agent (purchased from Xiamen Rickman Chemical Technology Co., Ltd.) was added to eliminate possible bubbles to finally obtain the anti-corrosive nano concrete grouting material.

The anti-corrosive nano concrete grouting material was poured into a semi-grouting reinforcement sleeve through a gravity grouting method to test electrochemical parameters and mechanical fatigue behavior of the reinforcement; it was tried to embed the reinforcement sleeve into a connection node of coastal prefabricated lotus root type beams for quick formation to obtain an anti-corrosive nano concrete grouting material sleeve lotus root type beam, and its rapid connection and anti-corrosion durability were evaluated.

In step S2, the swelling rate and coating thickness of GO-PVAH@FA were 40% and 50 μm, respectively. In step S4, the relevant performance of the anti-corrosive nano concrete grouting material was as shown in Table 1.

Embodiment 3

A process for preparing an anti-corrosive nano concrete grouting material according to the present embodiment specifically included the following steps:

S1: 0.3 kg of PVA was dissolved in 5 L of 65° C. hot water to prepare a PVA aqueous solution with a concentration of 6%, an average polymerization degree of 500-600 and an alcoholysis degree of 88%; 5 L of 4 mg/mL GO aqueous dispersion was mixed into the PVA aqueous solution in the presence of 0.02 kg of potassium chlorate (PVA oxidant), and PVA prepolymers were intercalated into GO sheet layer structures by adopting an in-situ polymerization and intercalation process to obtain a GO-PVA prepolymer solution;

S2: 1.2 kg of FA, 0.15 kg of an SBTJM-9 polycarboxylic acid and melamine resin combined high-efficiency water reducer (purchased from Jiangsu Sobute New Material Co., Ltd.) and 0.01 kg of boric acid (PVA catalyst) were added to the GO-PVA prepolymer solution, then GO-PVA hydrogel (GO-PVAH) was coated on a surface of FA particles by adopting an oil bath thermal ultrasonic dispersion process (oil temperature: 100° C., frequency: 20 kHz, power: 50 W, ultrasonic time: 60 min) to obtain GO-PVAH@FA with a swelling rate of 50% and a coating thickness of 100 μm, and the GO-PVAH@FA was sealed for subsequent use;

S3: the GO-PVAH@FA was added to an admixture aqueous solution formed by the remaining 0.15 kg of SBTJM-9 polycarboxylic acid and melamine resin combined high-efficiency water reducer and 0.3 kg of tartaric acid, and uniform mixing was performed at high speed to obtain GO-PVAH@FA suspension; at the same time, 25 kg of expansible compound cement (consisting of 12 kg of 625 High-belite SAC, 12 kg of P.I 62.5 Portland cement and 1 kg of gypsum), 40 kg of copper nickel slag sand (copper nickel slag sand of Jinchuan Group Co., Ltd., with an apparent density of 2870 kg/m³ and $SiO_2$ and MgO as main components) (consisting of 10 kg of coarse sand, 10 kg of medium sand, 10 kg of fine sand and 10 kg of ultra-fine sand) and 1 kg of volcanic ash were mechanically mixed to form a corresponding dry mixture of grouting material;

S4: the GO-PVAH@FA suspension was added to the corresponding dry mixture of grouting material through a DE-500 shear emulsifier, uniform mechanical mixing was performed (rotating speed: 2500 rpm, duration: 2 min), 0.004 kg of RK-1805S polyether modified polysiloxane defoaming agent (purchased from Xiamen Rickman Chemical Technology Co., Ltd.) was added to eliminate possible bubbles, and tried to further eliminate bubbles produced by high-speed mixing through vacuum pumping to finally obtain the anti-corrosive nano concrete grouting material.

The anti-corrosive nano concrete grouting material was poured into a full-grouting reinforcement sleeve through a pressure grouting method to test electrochemical parameters and mechanical fatigue behavior of the reinforcement; it was tried to embed the reinforcement sleeve into a connection node of coastal prefabricated column supports for quick formation to obtain an anti-corrosive nano concrete grouting material sleeve support, and its rapid connection and anti-corrosion durability were evaluated.

In step S2, the swelling rate and coating thickness of GO-PVAH@FA were 40% and 50 μm, respectively. In step S4, the relevant performance of the anti-corrosive nano concrete grouting material was as shown in Table 1.

Embodiment 4

The preparation method in the present embodiment was the same as that in Embodiment 1. The difference lay in that, in step S3, 20 kg of expansible compound cement was consisted of 10 kg of 425 SAC and 10 kg of P.I 42.5 Portland cement, and did not contain gypsum, and the amount of the corresponding mineral admixture was 0 kg.

In step S2, the swelling rate and coating thickness of GO-PVAH@FA were 30% and 65 μm, respectively. In step S4, the relevant performance of the anti-corrosive nano concrete grouting material was as shown in Table 1.

TABLE 1

Comparison result of performance test of anti-corrosive nano concrete grouting materials in all embodiments

| Test item | | Performance index value | | | | | |
|---|---|---|---|---|---|---|---|
| | | Conventional grouting material | Grouting material in CN110015871A | Embodiment 1 | Embodiment 2 | Embodiment 3 | Embodiment 4 |
| Fluidity | Initial | 340 | 330 | 345 | 335 | 350 | 345 |
| | After 30 min | 325 | 315 | 335 | 325 | 335 | 330 |
| Compressive strength (MPa) | 1 d | 41.2 | 43.0 | 40.1 ± 3.7 | 43.6 ± 2.9 | 49.8 ± 2.5 | 61.2 ± 4.7 |
| | 3 d | 70.7 | 72.0 | 62.8 ± 4.2 | 69.2 ± 5.8 | 74.4 ± 3.3 | 83.6 ± 6.1 |
| | 7 d | — | — | 72.5 ± 5.3 | 81.3 ± 6.2 | 87.8 ± 4.5 | 90.1 ± 5.4 |
| | 28 d | 101.6 | 103 | 78.3 ± 5.6 | 84.1 ± 5.9 | 91.3 ± 4.1 | 101.6 ± 7 |
| Vertical expansion rate (%) | 3 h | 0.02 | 0.03 | 0.025 | 0.032 | 0.033 | 0.042 |
| | Difference between values at 24 h and 3 h | 0.03 | 0.05 | 0.052 | 0.056 | 0.058 | 0.061 |
| Bleeding rate (%) | | 0 | 0 | 0 | 0 | 0 | 0 |
| $Cl^-$ content (%) | | 0.01 | 0.01 | 0.012 | 0.012 | 0.013 | 0.013 |
| 56 d $Cl^-$ diffusion coefficient ($10^{-12}$ m²/s) | | 2.0 | 1.4 | 1.3 | 1.2 | 1.15 | 1.10 |
| Corrosion resistance coefficient | | 0.76 | 1.00 | 1.00 | 1.00 | 1.00 | 1.00 |

TABLE 1-continued

Comparison result of performance test of anti-corrosive nano concrete grouting materials in all embodiments

| Test item | Conventional grouting material | Grouting material in CN110015871A | Embodiment 1 | Embodiment 2 | Embodiment 3 | Embodiment 4 |
|---|---|---|---|---|---|---|
| Reinforcement potential (mV) | — | — | −182 | −175 | −157 | −126 |
| 56 d reinforcement corrosion current density ($\mu A \cdot cm^2$) | — | — | 0.45 | 0.51 | 0.66 | 0.87 |
| Interfacial bonding strength (MPa) | — | — | 1.25 | 1.48 | 1.69 | 2.05 |

Finally, the foregoing descriptions are merely exemplary embodiments of the present invention, but are not intended to limit the present invention. Although the present invention is described in detail with reference to the foregoing embodiments, for a person skilled in the art, modifications may still be made to the technical solutions recorded in the foregoing embodiments, or equivalent replacements may be made to the part. Any modification, equivalent replacement, or improvement made and the like within the spirit and principle of the present invention shall fall within the protection scope of the present invention. The specific implementations of the present invention are described above, but are not intended to limit the protection scope of the present invention. A person skilled in the art should understand that various modifications or deformations may be made without creative efforts based on the technical solutions of the present invention, and such modifications or deformations shall fall within the protection scope of the present invention.

What is claimed is:

1. An anti-corrosive concrete grouting material for coastal structure connection, wherein the anti-corrosive concrete grouting material for coastal structure connection consists of the following raw materials in parts by weight: 1 part of expansible compound cement, 1-2 parts of slag sand, 0.05-0.2 part of fly ash, 0.005-0.05 part of polyvinyl alcohol, 0.0002-0.002 part of graphene oxide, 0.005-0.01 part of a water reducer, 0.005-0.01 part of an adjusting admixture, 0.0001-0.001 part of a defoaming agent, 0-0.05 part of a mineral admixture and 0.25-0.55 part of water, wherein:
the polyvinyl alcohol and graphene oxide are prepared into a GO-PVA prepolymer solution by adopting an in-situ polymerization and intercalation method, and
the fly ash is coated with the GO-PVA prepolymer solution to obtain GO-PVAH@FA.

2. The anti-corrosive concrete grouting material for coastal structure connection according to claim 1, wherein the grouting material consists of the following raw materials in parts by weight: 1 part of the expansible compound cement, 1-1.5 parts of the slag sand, 0.05-0.1 part of the fly ash, 0.005-0.025 part of the polyvinyl alcohol, 0.0002-0.001 part of the graphene oxide, 0.005-0.0075 part of the water reducer, 0.005-0.0075 part of the adjusting admixture, 0.0001-0.0005 part of the defoaming agent, 0-0.025 part of the mineral admixture and 0.25-0.4 part of water;
or the grouting material consists of the following raw materials in parts by weight: 1 part of the expansible compound cement, 1.5-2 parts of the slag sand, 0.1-0.2 part of the fly ash, 0.025-0.05 part of the polyvinyl alcohol, 0.001-0.002 part of the graphene oxide, 0.0075-0.01 part of the water reducer, 0.0075-0.01 part of the adjusting admixture, 0.0005-0.001 part of the defoaming agent, 0.025-0.05 part of the mineral admixture and 0.4-0.55 part of water.

3. A method comprising applying the anti-corrosive concrete grouting material for coastal structure connection according to claim 2 in construction of coastal structure engineering, wherein the coastal structure engineering comprises offshore buildings, bridges and tunnels, wind and nuclear power plants, oil drilling platforms, seaports and wharfs.

4. The anti-corrosive concrete grouting material for coastal structure connection according to claim 1, wherein the expansible compound cement consists of the following raw materials in parts by weight: 1 part of sulphoaluminate cement, 0.65-1.25 parts of Portland cement and 0-0.15 part of gypsum.

5. A method comprising applying the anti-corrosive concrete grouting material for coastal structure connection according to claim 4 in construction of coastal structure engineering, wherein the coastal structure engineering comprises offshore buildings, bridges and tunnels, wind and nuclear power plants, oil drilling platforms, seaports and wharfs.

6. The anti-corrosive concrete grouting material for coastal structure connection according to claim 1, wherein the slag sand is one or a combination of more of blast furnace heavy slag sand, steel slag sand, titanium steel slag sand, copper nickel slag sand and nickel iron slag sand.

7. A method comprising applying the anti-corrosive concrete grouting material for coastal structure connection according to claim 6 in construction of coastal structure engineering, wherein the coastal structure engineering comprises offshore buildings, bridges and tunnels, wind and nuclear power plants, oil drilling platforms, seaports and wharfs.

8. The anti-corrosive concrete grouting material for coastal structure connection according to claim 1, wherein the water reducer is one or an optimized combination of more of polycarboxylic acid high-efficiency water reducer, naphthalene sodium sulfonate high-efficiency water reducer or melamine resin high-efficiency water reducer;
or the adjusting admixture is one of gluconate retarder, citric acid, tartaric acid and salt retarders thereof or lignosulfonate water-reducing retarder;
or the defoaming agent is one of silicone, polyether and polyether modified polysiloxane defoaming agents;
or the mineral admixture is one or a combination of more of ground slag, fly ash, volcanic ash, silica fume or zeolite powder;

or the water is one of distilled water, deionized water or tap water.

9. A method comprising applying the anti-corrosive concrete grouting material for coastal structure connection according to claim 8 in construction of coastal structure engineering, wherein the coastal structure engineering comprises offshore buildings, bridges and tunnels, wind and nuclear power plants, oil drilling platforms, seaports and wharfs.

10. A method comprising applying the anti-corrosive concrete grouting material for coastal structure connection according to claim 1 in construction of coastal structure engineering, wherein the coastal structure engineering comprises offshore buildings, bridges and tunnels, wind and nuclear power plants, oil drilling platforms, seaports and wharfs.

* * * * *